United States Patent
Prestwich et al.

(10) Patent No.: US 7,606,288 B2
(45) Date of Patent: Oct. 20, 2009

(54) BURST SPREAD SPECTRUM RADIO SYSTEM AND METHOD FOR ASSET TRACKING AND DATA TELEMETRY

(75) Inventors: Sy Prestwich, Riverton, UT (US); Scott Bevan, Lehi, UT (US); Dirk Ostermiller, Draper, UT (US); K. Deric Eldredge, West Jordan, UT (US)

(73) Assignee: S5 Wireless, Inc., Sandy, UT (US)

( * ) Notice: Subject to any disclaimer, the term of this patent is extended or adjusted under 35 U.S.C. 154(b) by 781 days.

(21) Appl. No.: 11/140,081

(22) Filed: May 27, 2005

(65) Prior Publication Data

US 2006/0268961 A1    Nov. 30, 2006

(51) Int. Cl.
*H04B 1/00* (2006.01)
(52) U.S. Cl. .................. 375/130; 375/135; 375/136; 375/146; 375/147; 375/219; 375/295; 375/316
(58) Field of Classification Search .................. 375/130, 375/135, 136, 146, 147, 219, 295, 316
See application file for complete search history.

(56) References Cited

U.S. PATENT DOCUMENTS

| | | | |
|---|---|---|---|
| 6,657,586 B2 | 12/2003 | Turner | |
| 6,757,320 B2 | 6/2004 | Tiedemann, Jr. et al. | |
| 6,842,444 B2 | 1/2005 | Bolgiano et al. | |
| 6,842,480 B1 | 1/2005 | Yang et al. | |
| 2001/0051526 A1* | 12/2001 | Ruutu et al. | 455/456 |
| 2004/0228267 A1* | 11/2004 | Agrawal et al. | 370/203 |

* cited by examiner

*Primary Examiner*—Ted Wang
(74) *Attorney, Agent, or Firm*—Austin Rapp & Hardman

(57) ABSTRACT

A system for wireless asset tracking is disclosed. The system includes a plurality of mobile devices. Each mobile device performs two spreading operations with two distinct PN codes, a first PN code and a second PN code. Data is transmitted by each mobile device using a burst direct sequence spread spectrum radio signal. The system also includes at least three base stations. Each base station is configured to receive the burst direct sequence spread spectrum radio signals from the mobile devices which includes decoding the signals by first de-spreading with the second PN code and second de-spreading with the first PN code. Each base station is further configured to add a timestamp to each data packet received. A system for calculating the location of the mobile devices creates location information for each mobile device by calculating the time difference of arrival of received bursts for each base station.

11 Claims, 13 Drawing Sheets

BURST SPREAD SPECTRUM RADIO SYSTEM AND METHOD FOR ASSET TRACKING AND DATA TELEMETRY

TECHNICAL FIELD

The present invention relates generally to wireless communication systems. More specifically, the present invention relates to systems and methods for asset tracking (geo-location) and asset monitoring (data telemetry) through the use of a burst spread spectrum radio system.

BACKGROUND

Many companies, governments and individuals have assets that are mobile and can be moved from place to place. For various reasons it may be desirable to know the specific location of an asset at a given time. For example, the government may wish to know the location of a shipping container for security reasons. In addition, a company may wish to know where a company vehicle or personnel are currently located. Someone operating a large warehouse may benefit from knowing where a particular item is located in the warehouse. Likewise, a construction company working on a large-scale, multi-acre construction site may want to know the location and/or status of its construction equipment (or other equipment) on the site.

Many personal, corporate, or government property items are vulnerable to security threats, theft or vandalism with no effective economical means of protection. Security systems that monitor the premises of a property are usually expensive and typically ineffective. Such monitoring security systems are also typically immobile, require human-intervention, and are slow to respond to trouble.

Modern technologies may be used in tracking assets. Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Computers typically have one or more processors. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many electronic devices include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and tells the processors what to do to carry out certain tasks. For example, the computer software running on a thermostat may cause an air conditioner to stop running when a particular temperature is reached or may cause a heater to turn on when needed.

Wireless communication technologies have also advanced to allow remote communication between people and devices. Common examples of wireless communication devices include cellular telephones, pagers, radio transmitters, cordless telephones, etc. As wireless communication technologies continue to advance, it is easier and cheaper to communicate without the need of wired devices.

Benefits may be realized if means were provided to enable assets to be effectively tracked through the use of modern wireless and computer technologies.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
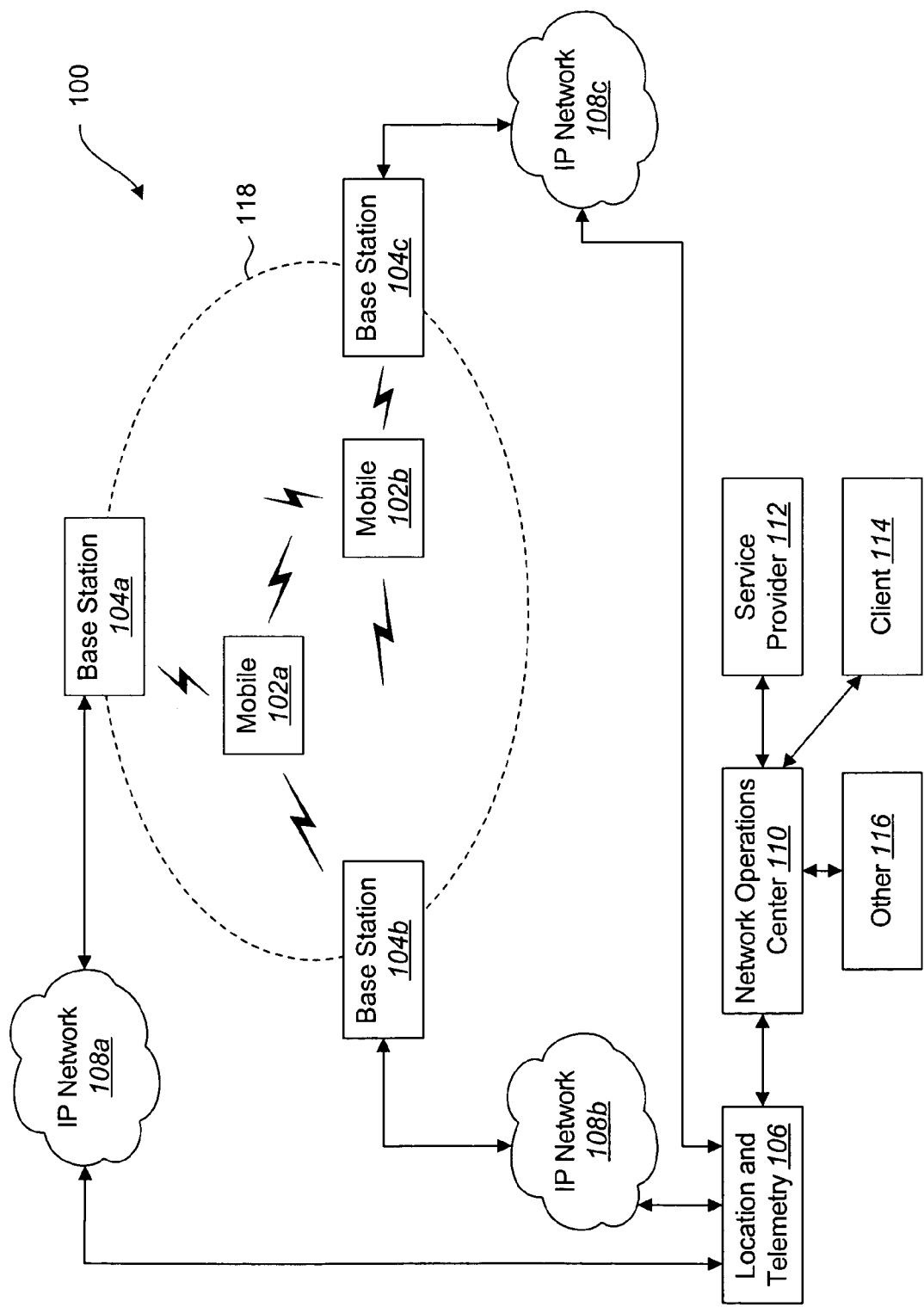
FIG. 1 is a block diagram of a system for asset tracking through the use of burst Direct Sequence Spread Spectrum (DSSS) radio signals.

A mobile device for use in a wireless asset tracking system is disclosed. The mobile device includes a transmitter that is configured to communicate with an antenna for transmitting wireless signals. In some embodiments, the communication by the mobile device is unidirectional. The mobile device also includes a processor and a memory. The memory is in electronic communication with the processor. The memory is configured such that it may include a device identification that identifies the mobile device. The memory also includes two pseudonoise (PN) codes, namely a first PN code and a second PN code. Instructions will also be stored in the memory of the mobile device. The instructions are configured such that they may be executed to implement a method for use in a wireless asset tracking system. Transmit data is spread (which in some embodiments may comprise information that identifies the mobile device) using the first PN code to provide first spread transmit data. The first spread transmit data is spread using the second PN code to provide second spread transmit data. The second spread transmit data is transmitted using a burst direct sequence spread spectrum radio signal.

The mobile device may further be designed such that the method implemented by the instructions in the memory also includes the step of waking the device out of a low power state through an internal or external trigger before spreading. The device may return back to the low power state after the transmit data has been transmitted. In some embodiments, the mobile device is not synchronized with any base station before, during or after transmitting. Likewise, such embodiments may further be configured such that the mobile device is not configured to perform any handshaking with any base station before, during or after transmitting.

The present embodiments also describe a base station that is configured for wireless communication with a plurality of remote mobile devices for use in a wireless asset tracking system. The base station includes an antenna and a receiver in electronic communication with the antenna. The receiver operates to receive wireless signals from the remote mobile device. In some embodiments, the wireless signal is a burst direct sequence spread spectrum radio signal. The base station also includes at least one processor and memory that is in electronic communication with the processor. Instructions are also stored in the memory of the base station. These instructions are capable of implementing a method for wireless communication with a plurality of remote mobile devices for use in a wireless asset tracking and data telemetry system. A wireless signal is received from a remote mobile device. The wireless signal is demodulated to obtain received data and first received signal. The received data is decoded by first de-spreading with a first PN code and second de-spreading with a second PN code to obtain received data. A timestamp is added to the received data according to the first received signal timing. The received data is transmitted with the timestamp to a system for calculating the location of the mobile device.

In some embodiments the base station may be synchronized to a timing reference: The timing reference may be a GPS receiver, a central radio beacon, or a timing reference transmitted over a wire or optical cable. In yet further embodiments, the base station may further comprise a first matched filter, a bank of frequency shifters that perform complex frequency shifts, and a bank of second matched filters.

The present embodiments also describe a system for wireless asset tracking which includes a plurality of devices. Each of the devices is configured to transmit its device identification. Likewise, each device may also perform two spreading operations with two distinct PN codes, namely a first PN code and a second PN code. Each device may also transmit data using a burst direct sequence spread spectrum radio signal. The devices may be, depending on the particular embodiment, stationary devices, mobile devices, or relatively stationary devices.

The system for wireless asset tracking may also include at least three base stations. Each base station is configured to receive the burst direct sequence spread spectrum radio signal from the devices. Of course, in some embodiments, the burst direct sequence spread spectrum radio signal may be received by only one of the base stations. Each base station is also configured to decode the signal by first de-spreading with the second PN code and second de-spreading with the first PN code. Each base station is further configured to add a timestamp to each piece of received data and to transmit the received data with the timestamp to a system for calculating the location of the devices.

Further, the system for wireless asset tracking may additionally include a system for calculating the location of the devices. This system is configured to create location information for each device by calculating the time difference of arrival of received bursts at each base station. This system for calculating the location of the devices is further configured to store the location and telemetry of the devices and to further provide an interface for other systems to access the information and the telemetry data.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Moreover, the methods, apparatus, and embodiments disclosed herein may provide advantages over previously known systems. Some of these advantages include very low cost (such as less than $5.00), low power consumption (and thus longer battery life) for the tracking device, indoor and outdoor tracking ability, as well as the capability of very long range data telemetry (with ranges of tens of miles or more in typical areas). Such features may, in some embodiments, provide advantages over the previously known systems because such previously known systems that are reasonably priced often have little range. Moreover, the present systems may have advantages over currently known long range tracking systems because such currently known systems have high costs and require frequent battery-replacement. Likewise, the present systems may have advantages over currently known systems using Global Positioning System (GPS) technology in that these GPS systems are high cost, have short battery life, and are limited in their ability to track devices indoors.

FIG. 1 is a block diagram of a system 100 for asset tracking through the use of burst Direct Sequence Spread Spectrum (DSSS) radio signals. The radio asset tracking and data telemetry system 100 comprises a plurality of mobile devices 102. Each mobile device 102 is a radio frequency device that transmits burst DSSS radio signals which are simultaneously received and processed by multiple receiver base stations 104. The base stations 104 are time synchronized using a number of techniques including but not limited to GPS time transfer, synchronization to a central radio beacon such as public broadcast or custom beacon, or synchronization to a timing reference transmitted over wire or optical cable. Also, each received burst is time stamped marking the first to arrive signal by differentiating between the first to arrive and any multipath signals. The base stations 104 and location and telemetry system 106 provide geo-location and data telemetry functionality.

Location information is created at the location and telemetry system 106 by calculating the Time Difference of Arrival (TDOA) of the received burst for each base station 104. The base stations 104 are in electronic communication with the location and telemetry system 106 through one or more networks 108, which in some embodiments, may be an IP network. Other types of networks 108 may also be used. An IP network 108 is an Internet Protocol network, which is known in the art.

The location and telemetry system 106 may, in some embodiments, provide additional functions including signal enhancement. In further embodiments, the location and telemetry system 106 may provide monitoring functions. Such monitoring functions may include monitoring the base station 104 or monitoring the performance of the network 108 (such as monitoring the signal strength, the location accuracy, etc.).

A network operations center 110 is in electronic communication with the location and telemetry system 106. The network operations center 110 provides access to the information and services of the location and telemetry system 106. As part of the network operations center 110, a database and application server stores the telemetry data and associated location information for end-user retrieval. Service providers 112 may be in communication with the network operations center 110 to provide services to third parties. Clients 114 may be in communication with the network operations center 110 to access the information and/or services available at the network operations center 110. Other 116 systems may also use the network operations center 110.

Many applications that require geo-location and data telemetry services are cost sensitive, size constrained, and require long battery life. This is especially true of the emerging machine-to-machine (M2M) applications that serve to wirelessly connect, monitor, and locate a multitude of machines and devices. Furthermore, many M2M applications require long-range wireless connectivity to adequately address large-area (e.g. 100's of square miles) deployment objectives.

Many short-range wireless standards have been developed such as BlueTooth and ZigBee to support data transmission, but these systems do not provide adequate range for long-range M2M applications and they do not provide geo-location capabilities. Long-range wireless systems such as traditional wireless or cellular systems do not adequately address these M2M applications either because they include unnecessary complexity and high costs in order to support complex human interfaces and applications such as voice traffic or data streaming that require high bandwidths.

Because geo-location is a key functional requirement for many applications, there have been many radio systems devised to provide position location capabilities. The most popular system in use today is the Global Positioning System (GPS).

Initially devised in 1974, GPS is widely used for position location, navigation, survey, and time transfer. The GPS system is based on a constellation of 24 Low Earth Orbit (LEO) satellites, each carrying a precision clock that is used to generate a pseudonoise (PN) signal which is then transmitted to Earth. The PN signals from each overhead satellite are received and demodulated by a GPS receiver which can then precisely determine position in three dimensions using pseudorange techniques. However, the received signal strength is relatively weak (on the order of −130 dBm as received by an omni-directional antenna) resulting in marginally useful or not useful at all in the presence of blockage or inside buildings. Furthermore, GPS receivers require significant battery power to operate and are relatively complex and expensive resulting in a poor solution for typical M2M applications.

The aforementioned systems and other disclosed and implemented systems fail to simultaneously achieve the long range, low cost, and low battery power objectives required by M2M applications.

The present systems and methods include low cost and simple wireless mobile devices 102 that communicate with processing power rich, intelligent, high-gain base stations 104 to serve geo-location and data telemetry applications. When taken as a whole, the system solution 100 provides dramatically increased range and penetration while simultaneously lowering the cost of the mobile devices 102 and extending device battery life due to the burst mode radio operation. Furthermore, the present systems and methods utilize multiple base stations 104 in concert to increase in-building penetration and wide-area coverage when compared to other long-range wireless networks. The result is a system that is capable of covering large geographic areas with very few base stations 104 while the mobile device 102 cost, complexity, and power consumption are kept low.

When wireless mobile device 102 transmissions occur, the signal travels at approximately 1 ft/nS (1 foot per nanosecond) to each of the network base stations 104. Each base station 104 continuously monitors the Radio Frequency (RF) spectrum for mobile device 102 transmissions. Additional base stations 104 deployed in a given area result in a more accurate device position determination. For each mobile device 102 DSSS transmission burst, all base stations 104 within range receive and process the radio burst. The received DSSS pseudonoise (PN) burst signal is demodulated at each base station 104 to determine device identification and extract the transmitted data. Each base station 104 also records the time of arrival of the radio burst relative to the synchronized timing reference. The time-of-arrival, or time stamp, information and demodulated data is then forwarded to the location and telemetry system 106. Other information including signal and time-stamp quality may also be sent to the location and telemetry system 106 for network monitoring and system performance enhancement purposes.

The location and telemetry system 106 utilizes the time stamps generated by the individual base stations 104 to calculate the TDOA location for each mobile device 102 transmission burst. The closer the transmission path is to line-of-sight (LOS) the better the transmission efficiency and ability to perform location fixing will be because the accuracy of the time stamps improves with LOS paths. Non-line-of-sight (NLOS) propagation paths provide one of the greatest challenges to accurately determining position using TDOA systems. Traditional radio receiver implementations work with the strongest arriving signal. However, if the strongest received radio signal from a mobile device 102 takes a NLOS path to a base station 104, the extra time it takes to traverse that path will in effect make that device 102 seem further away from the base station 104, creating a miscalculation. Each base station 104 receives and time stamps the LOS signal and other discernable NLOS signals. This allows each base station 104 to uniquely identify the LOS signal from NLOS signals and to optimally combine the LOS signal with NLOS signals to both improve data demodulation capability and to correctly identify the LOS signal component for more accurate location processing. Furthermore, LOS and NLOS time stamps and their relative quality estimates are used by the location and telemetry system to optimally combine the time stamps from multiple base stations to improve location accuracy calculations.

Another source of TDOA error results from the non-linear effects that occur when solving the hyperbolic TDOA equations. These effects result from errors in the timing of the direct path that produces errors in the position calculation. Errors due to NLOS paths, and non-linear TDOA effects are reduced if the device 102 is within range of more base stations 104 to reduce the possibility that the device 102 is in an area where there exists a NLOS path or in an area where hyperbolic errors are large. The disclosed systems and methods use all available data from base stations 104 within range of the device transmission to improve the location accuracy calculation performed within the location and telemetry system 106.

The present systems and methods can accommodate many simultaneous users in a single frequency band because the very long PN code provides a high processing gain (38 dB for the preferred embodiment) yielding superior anti-jam (AJ) performance. In order to uniquely separate the individual transmissions they must be offset in time by at least two DSSS chips and the power levels of the transmissions arriving at each base station 104 receiver must not exceed the AJ capabilities of the system. The large processing gain also provides superior interference rejection against other strong signals operating in the same frequency band.

In order to preserve device battery power, the time taken for a device to become transmit ready and successfully transmit is short.

The block diagram of FIG. 1 also illustrates the coverage area 118. The coverage area 118 is the area in which mobile devices 102 operate and their location can be determined and their data can be received through the present systems and methods. In the current system, wireless signals from the mobile device 102 should be received by at least three base stations 104 in order for the location and telemetry system 106 to accurately determine the location of the mobile device 102. Although the system will work with less than three base stations 104, the location information will not be as accurate as it would be if three or more base stations 104 were used. For data telemetry the signals need only be received at one base station 104.

It should also be noted that additional embodiments may be constructed in which the location of the device 102 is stationary (i.e., permanently positioned in one location) or "relatively stationary" with respect to the time between device 102 transmissions and the distance the device 102 moves in said time. "Relatively stationary" with respect to the time between device 102 transmissions means that the device does not move more than a pre-determined distance relative to the location accuracy desired. For example, if the location accuracy desired is within 30 feet, then to be relatively stationary would mean that the device does not move more than 30 feet in between transmissions.

In the embodiments in which the location of the device 102 is stationary or relatively stationary, the location and telemetry system 106 may ascertain the location of the device 102 using information obtained from at least three base stations 104. However, the information obtained from the three base stations 104 does not have to be information related to the same emitted signal. Rather, one or more of the base stations 104 may provide information regarding the device 102 that was previously gathered (i.e., information that was gathered from a previous signal emission). However, because the device 102 is stationary or relatively stationary, the timestamp derived from this previous signal is still accurate and may be used by the location and telemetry system 106 to determine the position of the device 102. Further embodiments may use information previously gathered by one or more of the base stations 104 as a means of improving and/or checking the calculations performed by the location and telemetry system 106.

Figure 2:
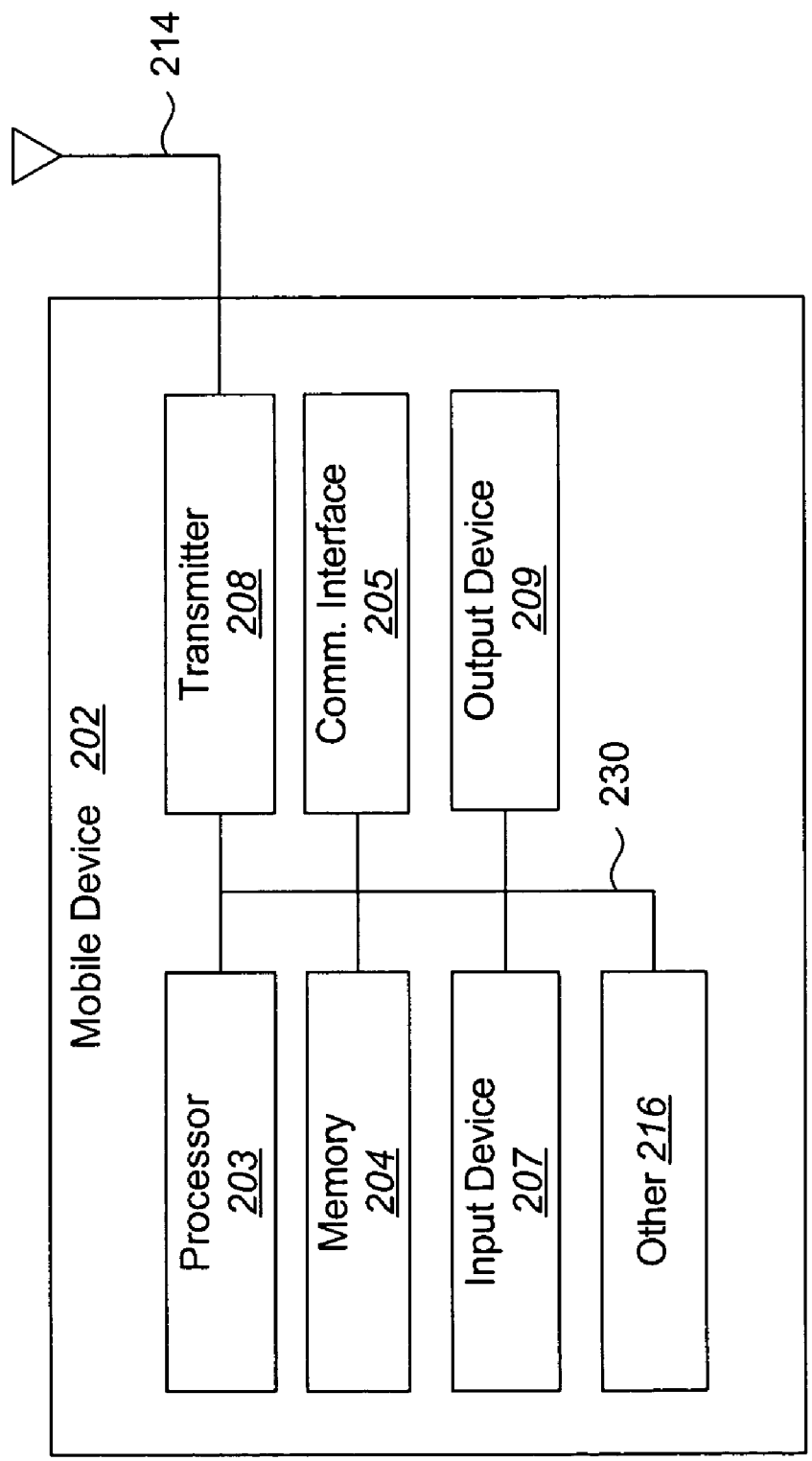
FIG. 2 is a general block diagram of hardware components that may be used with embodiments of a mobile device.

FIG. 2 is a general block diagram of hardware components that may be used with embodiments of a mobile device 202. The system 202 includes a processor 203 which controls operation of the system 202. The processor 203 may also be referred to as a CPU. The processor 203 may be embodied as a microprocessor, a microcontroller, a programmable gate array or integrated circuit, a digital signal processor (DSP) or other device known in the art. The processor 203 typically performs logical and arithmetic operations based on program instructions, or logical definitions, stored within the memory 204 or circuits contained within the processor 203.

Memory 204, which may include both read-only memory (ROM) and random access memory (RAM), provides instructions and data to the processor 203. A portion of the memory 204 may also include non-volatile random access memory (NVRAM). As used herein, the term "memory" 204 is broadly defined as any electronic component capable of storing electronic information, and may be embodied as read only memory (ROM), random access memory (RAM), magnetic disk storage media, optical storage media, flash memory devices in RAM, on-board memory included with the processor 203, EPROM memory, EEPROM memory, registers, etc. The memory 204 typically stores program instructions and other types of data. The program instructions may be executed by the processor 203 to implement some or all of the methods disclosed herein.

A transmitter 208 is included to allow transmission of data between the mobile device 102 and the base station 104. An antenna 214 is attached to the device 202 and is electrically coupled to the transmitter 208. Additional antennas (not shown) may also be used.

The system may also include one or more communication interfaces 205 for communicating with other electronic devices. The communication interfaces 205 may be based on wired communication technology, wireless communication technology, or both. Examples of different types of communication interfaces 205 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The system typically also includes one or more input devices 207 and one or more output devices 209. Typical input devices for the mobile device 202 may be one or more buttons or switches. More complex input devices are possible. Examples of different kinds of input devices 207 include a keyboard, mouse, microphone, remote control device, button, joystick, trackball, touchpad, lightpen, sensors, etc.

Because the mobile device 202 is typically a low cost device, the output device 209 is usually a low cost output device, such as one or more LEDs, an LCD screen and/or a speaker. Of course, more complex output devices are possible. Examples of different kinds of output devices 209 include a speaker, printer, etc. One specific type of output device 209 which is typically included in a computer system is a display device (shown as output device). Display devices used with embodiments disclosed herein may utilize any suitable image projection technology, such as a cathode ray tube (CRT), liquid crystal display (LCD), light-emitting diode (LED), gas plasma, electroluminescence, or the like. A display controller may also be provided, for converting data stored in the memory 204 into text, graphics, and/or moving images (as appropriate) shown on the display device.

Of course, FIG. 2 illustrates only one possible configuration of hardware components that may be used. Other components 216 may also be included in the mobile device 202. Those skilled in the art will recognize that various other architectures and components may be utilized. In addition, various standard components are not illustrated in order to avoid obscuring aspects of the invention.

The various components of the system 202 are coupled together by a bus system 230 which may include a power bus, a control signal bus, and a status signal bus in addition to a data bus. However, for the sake of clarity, the various busses are illustrated in FIG. 2 as the bus system 230. One skilled in the art will appreciate that the system 202 illustrated in FIG. 2 is a functional block diagram rather than a listing of specific components.

The mobile device 202 may be embodied with and/or used in a number of different applications. For example, the mobile device 202 may be used by a company to monitor the location of their inventory, fleet of equipment, mobile assets, utility infrastructure, etc. The mobile device 202 may also be used to sense/monitor the status of the equipment/inventory/assets either in large areas or in closed quarters such as buildings, warehouses, etc. Other embodiments may use the mobile device 202 to monitor the security/status of a stationary asset such as a building, vending machine, meter, etc. Still further embodiments of the mobile device 202 may be used to monitor the status of individual persons, such as the status/location of an inmate in a prison, a parolee, a child, etc. Additional embodiments may use the mobile device 202 as part of a telemedicine or telemedicine administration system. Further embodiments may be used in traffic control and highway maintenance systems. Governmental applications are also possible including security and/or location tracking for military bases or compounds, battlefields, airports, ports, borders, etc. as well as emergency response tracking/telemetry and other public safety applications. Other possible applications are also available.

Figure 3:
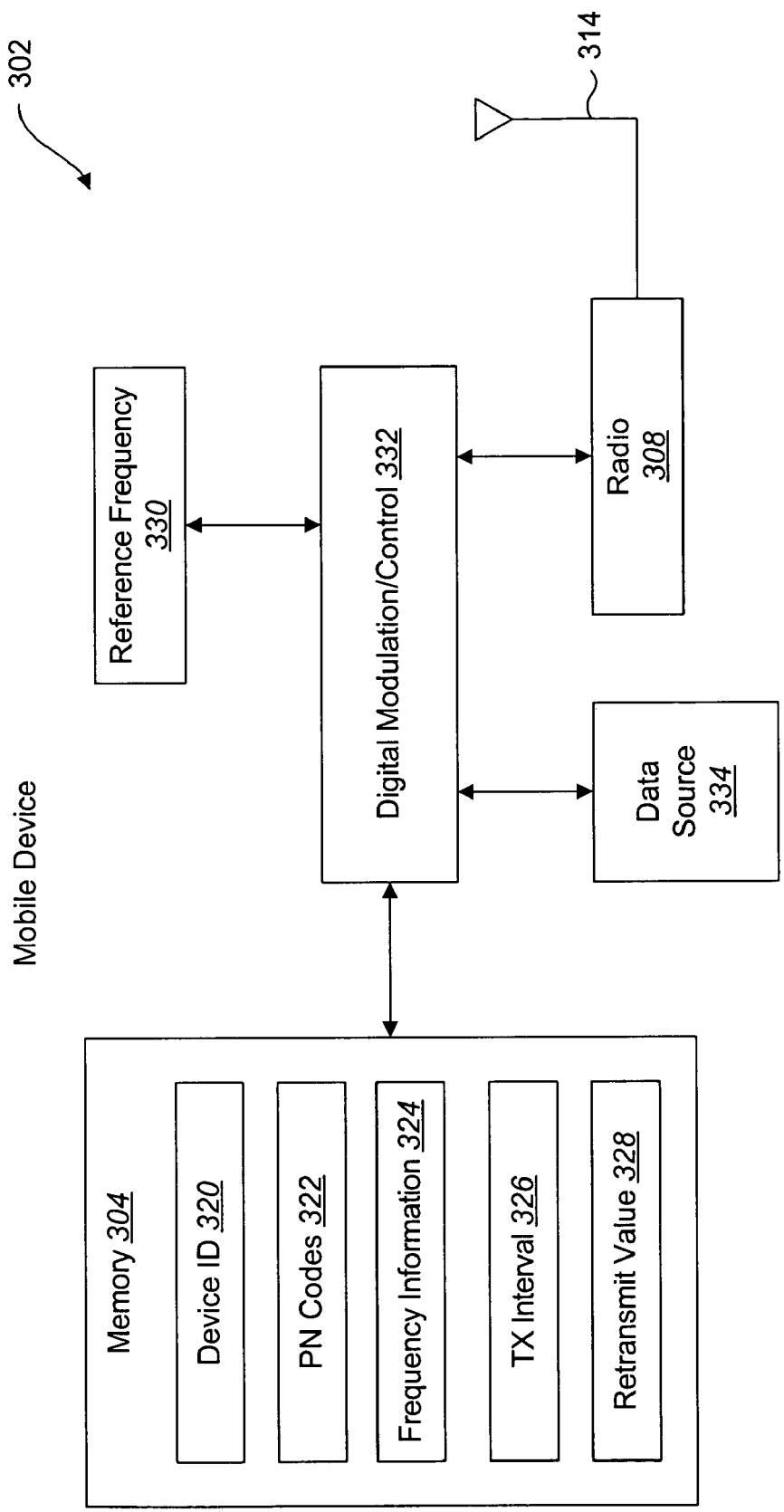
FIG. 3 is a functional block diagram of an embodiment of a mobile device.

FIG. 3 is a functional block diagram of an embodiment of a mobile device 302. The mobile device 302 includes several pieces of data that are stored in the memory 304. A device identification 320 (device ID) is an identifier for the device 302. The device ID 320 may identify the individual device 302, the device type, or other characteristics about the mobile device 302.

The PN codes 322 are the PN codes, or generator polynomials, that the mobile device 302 uses to code the DSSS transmit data. The frequency information 324 is the radio frequency or frequencies on which the data is to be transmitted. The TX interval 326 is the average interval in between transmissions. The interval generator includes a method to randomize the transmit interval. The retransmit value 328 is the number of times that the data is to be transmitted to increase the probability of reception.

The reference frequency 330 is provided by a reference frequency oscillator (not shown). The digital modulation and control block 332 may control the reference frequency oscillator, which in turn directly affects the reference frequency 330.

The digital modulation and control block 332 performs the modulation of the data using the PN codes. The method of modulating the data will be described below. The digital modulation and control block may also perform device control including data management, radio control, input/output control, etc.

The data source 334 is the data to be modulated. The data source 334 includes the device ID 320 and may also include other information. As described above, the radio 308 is used to transmit the data through use of the antenna 314.

Figure 4:
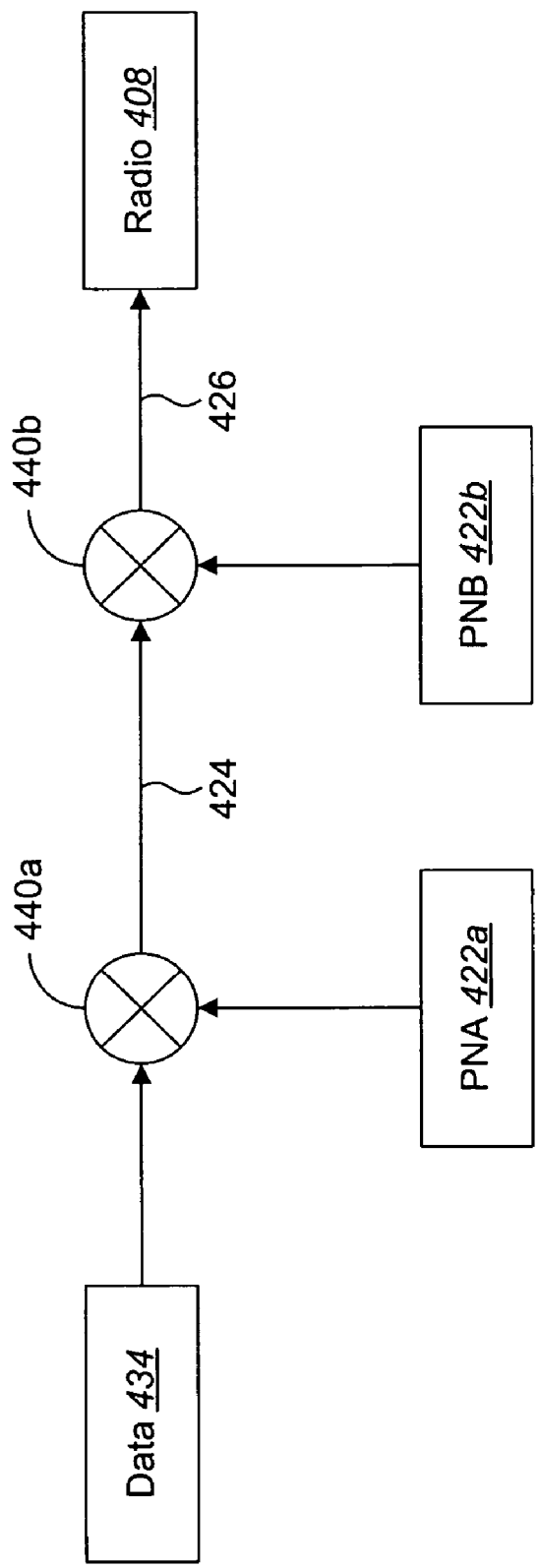
FIG. 4 is a functional block diagram of the spreading that occurs in the mobile device.

FIG. 4 is a functional block diagram of the spreading that occurs in the mobile device 102. The mobile device 102 performs two spreading operations. First the data 434 is spread 440a using a first PN code, PNA 422a. Then the result 424 is spread 440b using a second PN code, PNB 422b. The final data 426, after being spread twice, is transmitted using the radio 408.

Processing gain in spread spectrum communications can be used to increase link distance and margins, and is directly related to the length of the PN code used. For example a PN length of 1,000 yields a processing gain of 30 dB, while a PN length of 10,000 yields a processing gain of 40 dB, respectively.

The base stations 104 (shown in FIG. 1) simultaneously receive signals from a multitude of devices 102 (shown in FIG. 1), each with a corresponding frequency error. This fact precludes locking the receiver in the base station 104 to an individual client device 102 to achieve frequency coherence across long PN sequences.

In order to achieve high processing gain with smaller implementation costs and in order to provide scalable data rates, this system incorporates concatenated PN Sequences as shown in FIG. 4. Scalable data rates may be used in some embodiments, but may not be used in other embodiments. In one of the present embodiments, the PNA length is 7 and the PNB length is 1023 (as is shown below in Table 1). Of course, other alternative embodiments may be used (as described below) to achieve a specific scalable data range. Thus, the present embodiments include, but are not limited to, the examples of the codes listed below. Rather, other codes are available and may also be used. One example of an embodiment for a scalable data range may have data bits that are first spread 440a from 1 to 31 chips by a variable PNA code 422a. The resulting chips 424 are further spread 440b by a second fixed length PNB code 422b. With a chipping rate of 5 Mega chips per second, the resulting data rates scale from 19.608 kbps to 326 bits/second with processing gains from 24 to 42 dB, respectively, depending on the application requirements and available link SNR. The receiver in the base station 104 is architected such that devices 102 of all speeds may be received simultaneously.

Table 1 illustrates the various data rates that can be achieved corresponding to various PN lengths. Table 1 assumes 5,000,000 chips per second.

TABLE 1

| PNA Length | 1 | 3 | 7 | 15 | 31 | 1 | 3 | 7 | 15 |
|---|---|---|---|---|---|---|---|---|---|
| PNB Length | 255 | 255 | 255 | 255 | 255 | 1023 | 1023 | 1023 | 1023 |
| Chips/Bit | 255 | 765 | 1785 | 3825 | 7905 | 1023 | 3069 | 7161 | 15345 |
| Processing Gain | 24 | 29 | 33 | 36 | 39 | 30 | 35 | 39 | 42 |
| Data Rate | 19608 | 6536 | 2801 | 1307 | 633 | 4888 | 1630 | 698 | 326 |

The length of the second PNB 422b is designed to be short enough such that the worst case frequency error plus doppler shift will cause no more than a predetermined amount of correlation loss. For example, in one of the presently preferred embodiments, 180 degrees of phase roll results in approximately 4.5 dB correlation loss in the first (PNB) matched filter.

The PN codes may be selected according the desired processing gain and the data rate versus tolerance to frequency error and then optimizing for optimum code performance including, for example, low cross-correlation properties, signal-to-noise, etc. Other ways of selecting the PN codes may, of course, also be used.

Figure 5:
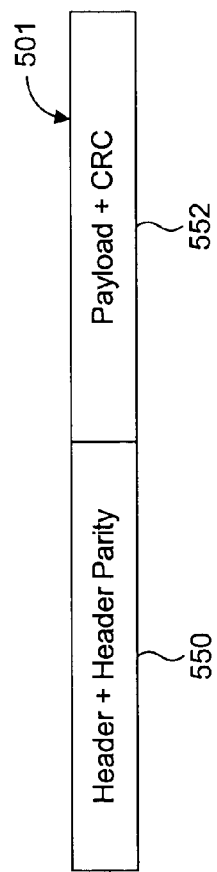
FIG. 5 is a block diagram of one general embodiment of a transmit packet.

The data that is to be transmitted is formatted into transmit packets 501. One general embodiment of a transmit packet 501 is shown in FIG. 5. The transmit packet 501 includes a header 550 and a payload 552. The header 550 includes overhead and identification information about the transmit packet 501, such as, synchronization information, device and packet identification 320, the size of the packet, the format of the payload, etc. The header 550 may also include information that informs the base stations 104 that the received transmission is valid. The header 550 may additionally include a CRC checksum for the header. The payload data 552 includes the information to be transmitted. The payload 552 may include descriptors, error-correction mechanisms, and any other additional information along with data. Additionally, the payload data 552 may include a CRC check.

Figure 6:
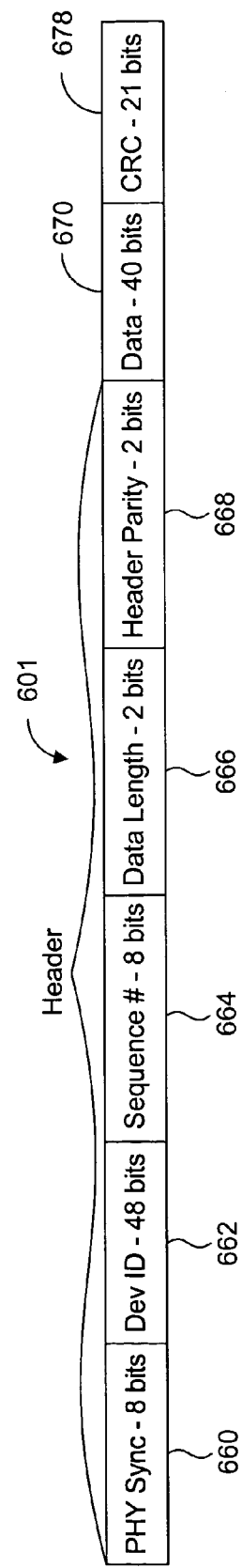
FIG. 6 is a block diagram of another embodiment of a transmit packet.

FIG. 6 is a block diagram of an embodiment of a transmit packet 601. Other embodiments may expand or reduce the overall datagram length by incorporating encryption or other information as necessary.

At the physical layer, there is a PHY Sync header 660 that is 4 to 12 bits. This header is used at the base station 104 to lock onto the signal, initialize the receiver in the base station 104, and to quickly determine whether a valid data packet is present. A device ID 662 that operates to identify the device 102 (not shown in FIG. 6) may also be added. This device ID may be of various bit lengths. Additionally a sequence number 664 and a data length 666, each having a variety of bit lengths, may also be added. The data length 666 indicates the length of the payload data. In some embodiments, the sequence number 664 may be used to align the received packets into the proper order and as an anti-spoofing measure. The payload data 670 may include data of a variety of bit lengths, including 40 bits. Also, the CRC check field 678 may be added to the end of the payload data 670.

Figure 7:
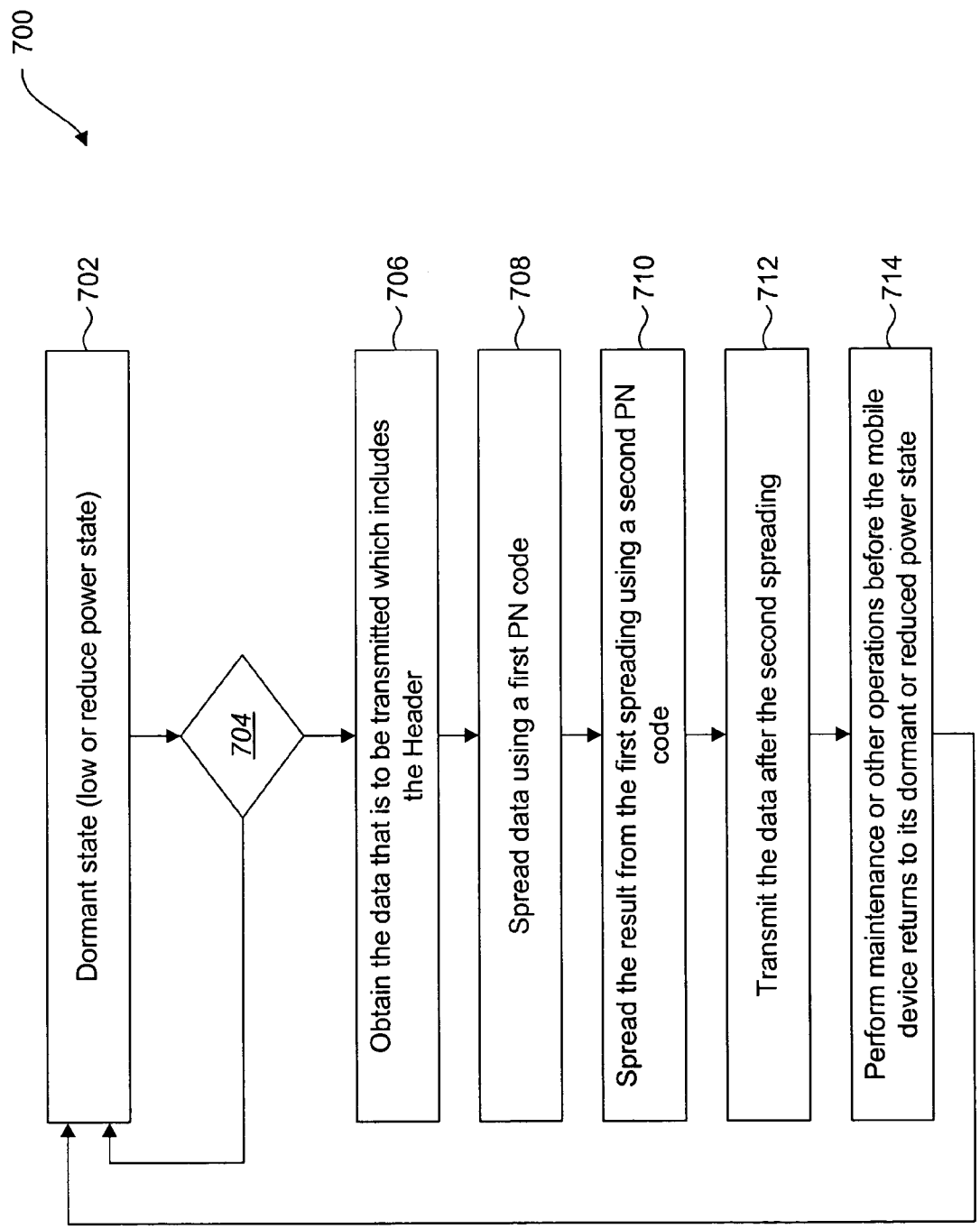
FIG. 7 is an embodiment of a method of operation for a mobile device.

FIG. 7 is an embodiment of a method 700 of operation for a mobile device 102. The mobile device 102 is in a dormant state 702 for a portion of the time. The dormant state is typically a low or reduced power state that allows the mobile device 102 to save power while not transmitting. A wakeup event 704 or other trigger 704 wakes up the device 102. The trigger 704 could be a timer, an interrupt, or any other signal that may be used to pull the device 102 out of its dormant state. Once out of its dormant state, the mobile device 102 obtains 706 the data that is to be transmitted which includes the header information.

As shown and discussed in relation to FIG. 4, the data is first spread 708 by a first PN code, and then it is spread 710 by a second PN code. The resulting data is then transmitted 712. Then maintenance or other operations, such as resetting a sleep timer, are performed 714 before the mobile device 102 returns to its dormant or reduced power state 702.

In one embodiment the mobile device 102 only transmits and does not receive. Thus, the communication is one-way (simplex transmission), from the mobile device 102 to the base station 104. Because of this unidirectional design for this embodiment, there is no syncing requirement. That is, the mobile device 102 does not have to be time synchronized with the base station 104. Furthermore, no protocols are required because there is no handshaking that takes place between the mobile device 102 and the base station 104. Each mobile device 102 transmits burst DSSS radio signals.

One other aspect of the mobile device 102 is that the transmit power of the mobile device 102 is not controlled by the base station 104. Since the mobile device 102, in some embodiments, does not include a receiver, the mobile device 102 could not receive instructions from a remote base station 104 to increase or decrease transmit power.

Typically the mobile device 102 is also a low cost device. As a result, the mobile device 102 typically does not have a display or screen as an output device nor does it have a graphical user interface.

Figure 8:
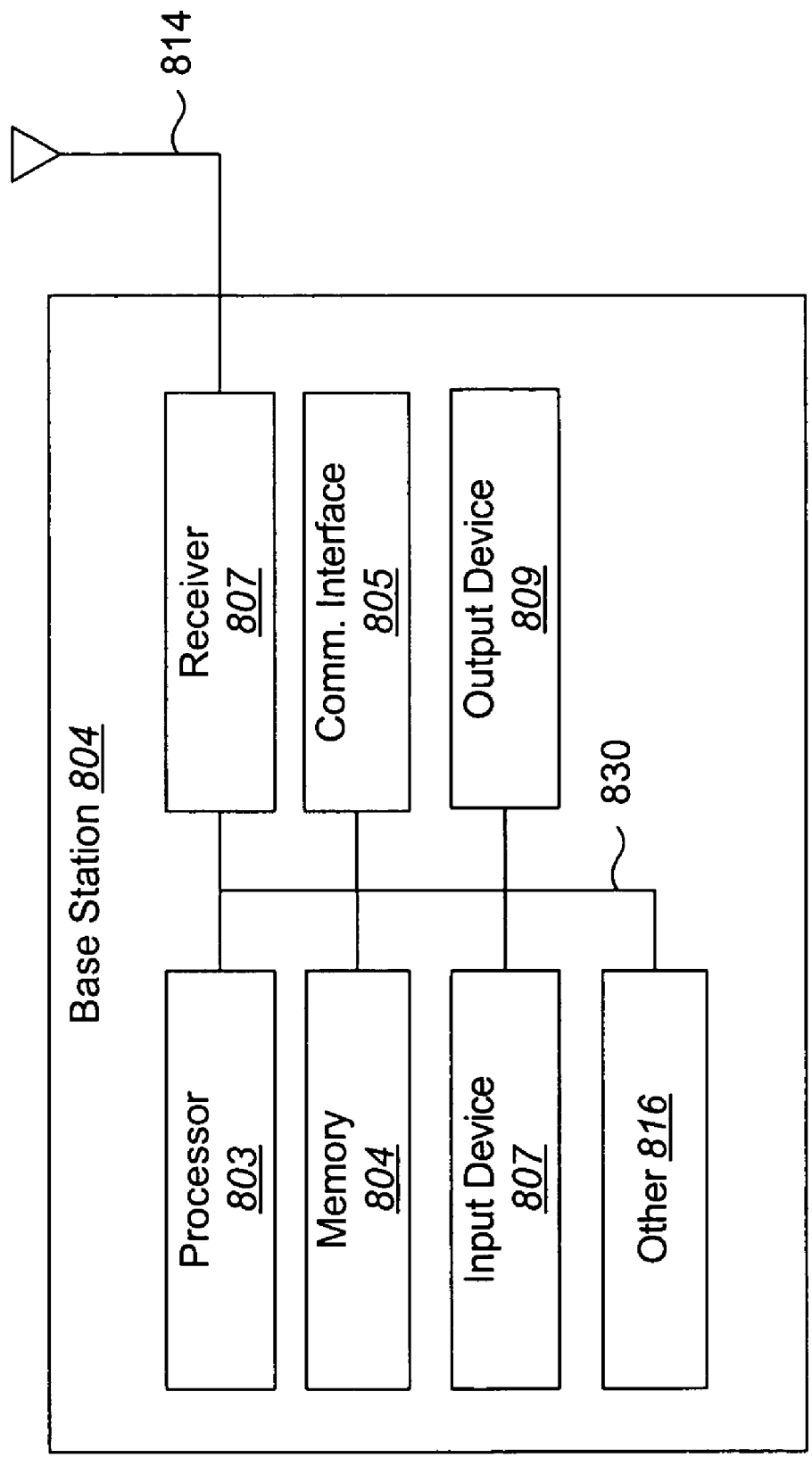
FIG. 8 is a general block diagram of hardware components that may be used with embodiments of a base station.

FIG. 8 is a general block diagram of hardware components that may be used with embodiments of a base station 804. The system 804 includes a processor 803 which controls operation of the base station 804. The processor 803 may also be referred to as a CPU. The processor 803 controls the operation of the system and may be embodied as a microprocessor, a microcontroller, a digital signal processor (DSP) or other device known in the art. The processor 803 typically performs logical and arithmetic operations based on program instructions stored within the memory 804.

Memory 804, which may include both read-only memory (ROM) and random access memory (RAM), provides instructions and data to the processor 803. A portion of the memory 804 may also include non-volatile random access memory (NVRAM). As used herein, the term "memory" 804 is broadly defined as any electronic component capable of storing electronic information, and may be embodied as read only memory (ROM), random access memory (RAM), magnetic disk storage media, optical storage media, flash memory devices in RAM, on-board memory included with the processor 803, EPROM memory, EEPROM memory, registers, etc. The memory 804 typically stores program instructions and other types of data. The program instructions may be executed by the processor 803 to implement some or all of the methods disclosed herein.

A receiver 807 is included to receive the wireless signals from the mobile devices 102. An antenna 814 is in electronic communication with the receiver 807. Additional antennas and receivers (not shown) may also be used. Other than the details included herein, and references herein, the operation of the receiver 807 and antenna 814 is well known in the art and need not be described herein.

The system may also include one or more communication interfaces 805 for communicating with other electronic devices and computing devices. For example, a communication interface 805 is used to communicate with the location and telemetry system 106 via an IP network 108. The communication interfaces 805 may be based on wired communication technology, wireless communication technology, or both. Examples of different types of communication interfaces 805 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, WLAN, and so forth.

The system typically also includes one or more input devices 807 and one or more output devices 809. Examples of various input devices 807 and output devices 809 were described above.

Of course, FIG. 8 illustrates only one possible configuration of hardware components that may be used. Other devices 816 may be included. Those skilled in the art will recognize that various other architectures and components may be utilized. In addition, various standard components are not illustrated in order to avoid obscuring aspects of the invention.

The various components of the system 804 are coupled together by a bus system 830 which may include a power bus, a control signal bus, and a status signal bus in addition to a data bus. However, for the sake of clarity, the various busses are illustrated in FIG. 8 as the bus system 830. One skilled in the art will appreciate that the system 804 illustrated in FIG. 4 is a functional block diagram rather than a listing of specific components.

In one embodiment the base station is implemented through the use of a personal computer in electronic communications with the receiver and high-performance cards that are configured to decode and demodulate the received wireless signals from the mobile devices.

Figure 9:
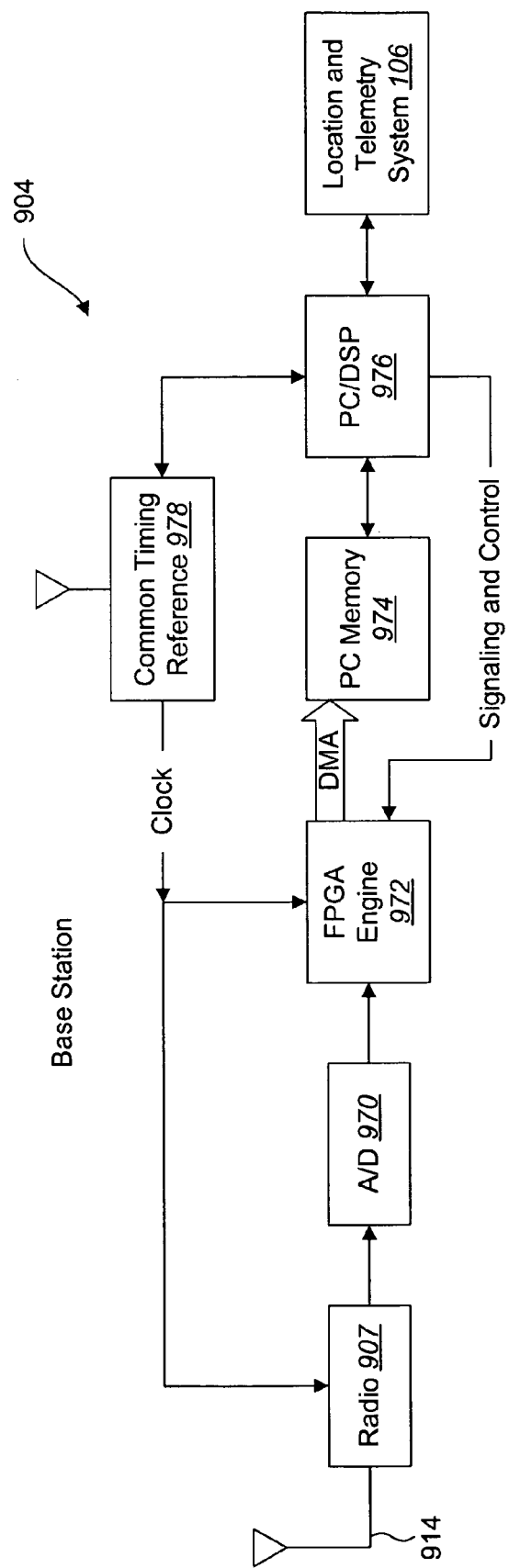
FIG. 9 is a functional block diagram of an embodiment of a base station.
Figure 10:
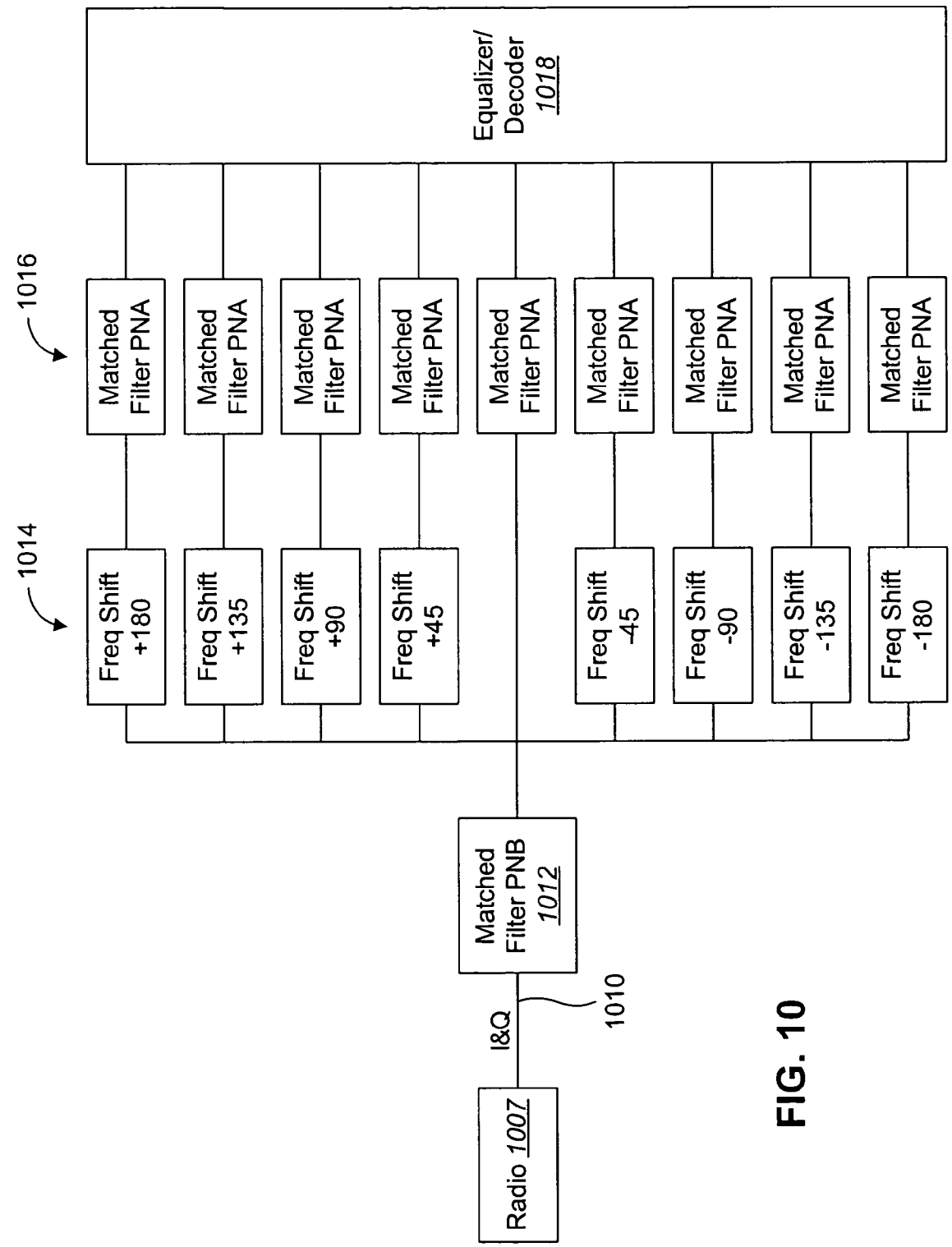
FIG. 10 is a functional block diagram of the demodulating and decoding that takes place at the base station.

FIG. 9 is a functional block diagram of an embodiment of a base station 904. The base station 904 includes a radio 907 and antenna 914 that receive the wireless signals from the mobile devices 102. The base station 904 includes analog to digital converter functions (A/D) 970 to convert the received wireless signal from analog to digital. A hardware acceleration engine 972 is used to despread and decode the data. A more particular block diagram of the despreading and decoding is shown in FIG. 10. The despread and decoded data is then stored in some type of memory 974. A computer 976 may be used to control the base station 904 and send data to and from the location and telemetry system 106. The computer 976 is in electronic communication with the location and telemetry system 106 through an IP network 108.

The present systems and methods utilize multiple base stations 904 synchronized to a common timing reference. The base stations 904 are time synchronized to each other (typically within billionths of a second) to deliver accurate positioning data. This base station 904 synchronization can be accomplished using a number of techniques including but not limited to GPS time transfer, synchronization to a central radio beacon such as public broadcast or custom beacon, or synchronization to a timing reference transmitted over wire or optical cable. If the GPS time transfer method is used, a GPS receiver 978 is included at the base station 904. The base stations 104 are connected to a location and telemetry system 106 via an IP network 108 and the location and telemetry system 106, utilizing Time Difference Of Arrival (TDOA) techniques, determines the locations of the mobile devices 102.

The received DSSS pseudonoise (PN) burst signal is despread and demodulated to determine device identification and extract the transmitted data. Each base station 904 also determines and records the time of arrival of the radio burst relative to the synchronized timing reference. The time-of-arrival, or time stamp, information and demodulated data is then forwarded to the location and telemetry system 106.

FIG. 10 is a functional block diagram of the DSSS despreading that takes place at the base station 104. The radio receiver 1007 receives the wireless signal. The I&Q data channels 1010 are first processed by a matched filter 1012 with the PNB codes 422b as coefficients. It is desirable to have a low cost device that includes low cost components. A crystal is an example of a low cost radio frequency reference. Because the crystal oscillator has limited frequency accuracy the received signal at the base station can be in error and cause correlation loss in the matched filter 1012. In one of the embodiments, the correlation loss is limited by design to 4.5 dB or less, for example. FIG. 10 functionally shows the reduced complexity matched filter architecture to limit correlation loss due to frequency error. Since frequency error results in phase roll across the PN sequence causing correlation loss, a bank of frequency shifters 1014 is incorporated prior to running the data through the second PNA matched filters 1016. The number of frequency shifters 1014 and PNA matched filters 1016 is determined by the desired worst case phase roll across the concatenated PN codes. The frequency shift blocks perform a complex frequency shift.

The equalizer/decoder 1018 uses all the outputs of the matched filter bank structure to determine the frequency shift of the incoming signal and select a set of advantageous signals. The signal selection criteria seeks to maximize demodulation performance by selecting signals with the best signal to noise ratio (SNR) and other demodulation metrics that will be evident to those skilled in the art. However, the concatenated codes method of implementing DSSS spreading introduces well defined partial correlation signals that repeat every PNB chips and appear as replicated signals or ghosts of the primary correlation signals. Since these ghosts are well defined in time they are identified and filtered out by the decoder system 1018.

Figure 11:
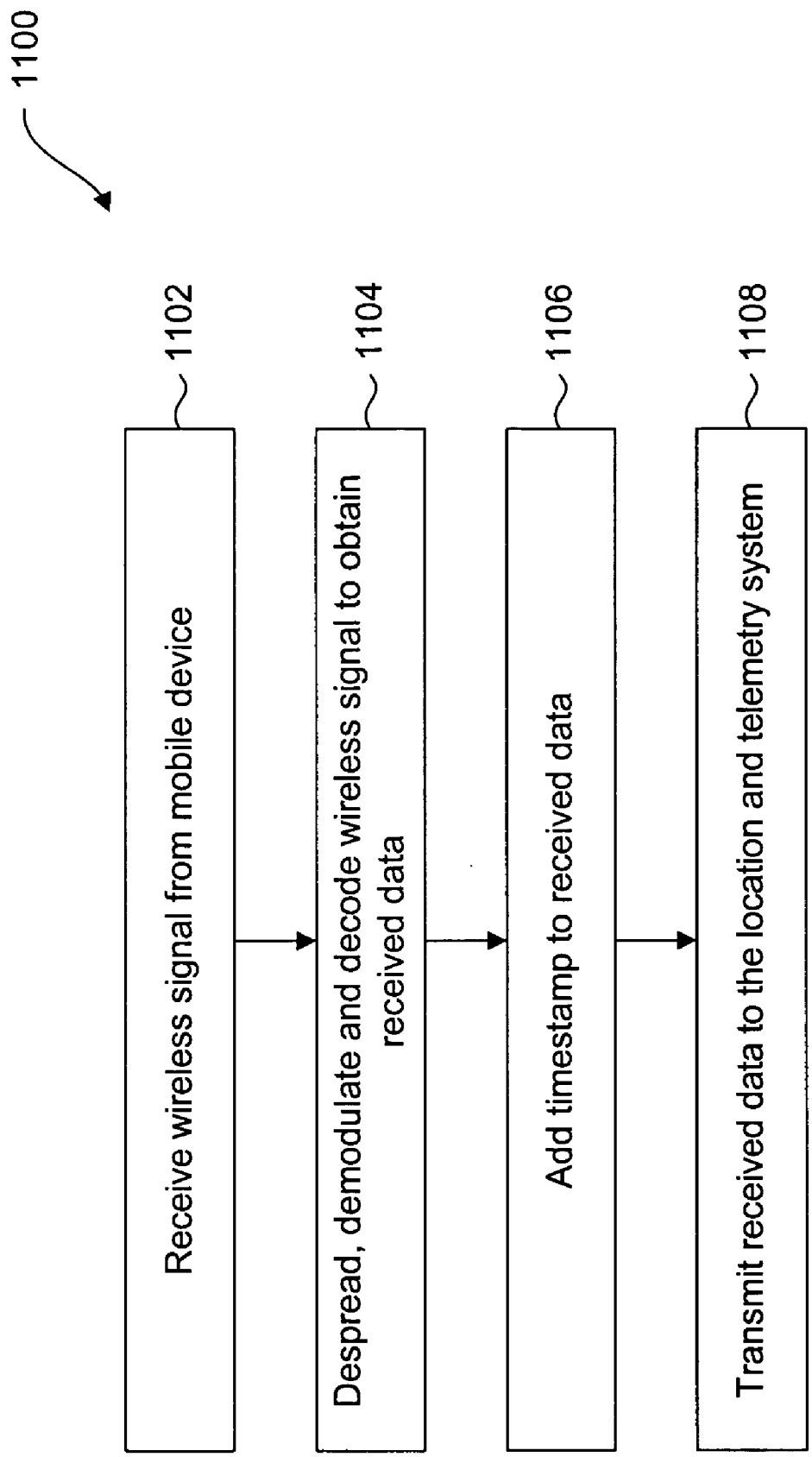
FIG. 11 is a flow diagram of an embodiment of a method of operation for a base station.

FIG. 11 is a flow diagram of an embodiment of a method 1100 of operation for a base station 104. The wireless signals from the mobile devices 102 are received 1102, despread, demodulated and decoded 1104. Then a timestamp is added 1106 to the data received. Then the received data is transmitted 1108 to the location and telemetry system 106 where the location of each mobile device 102 is determined.

Figure 12:
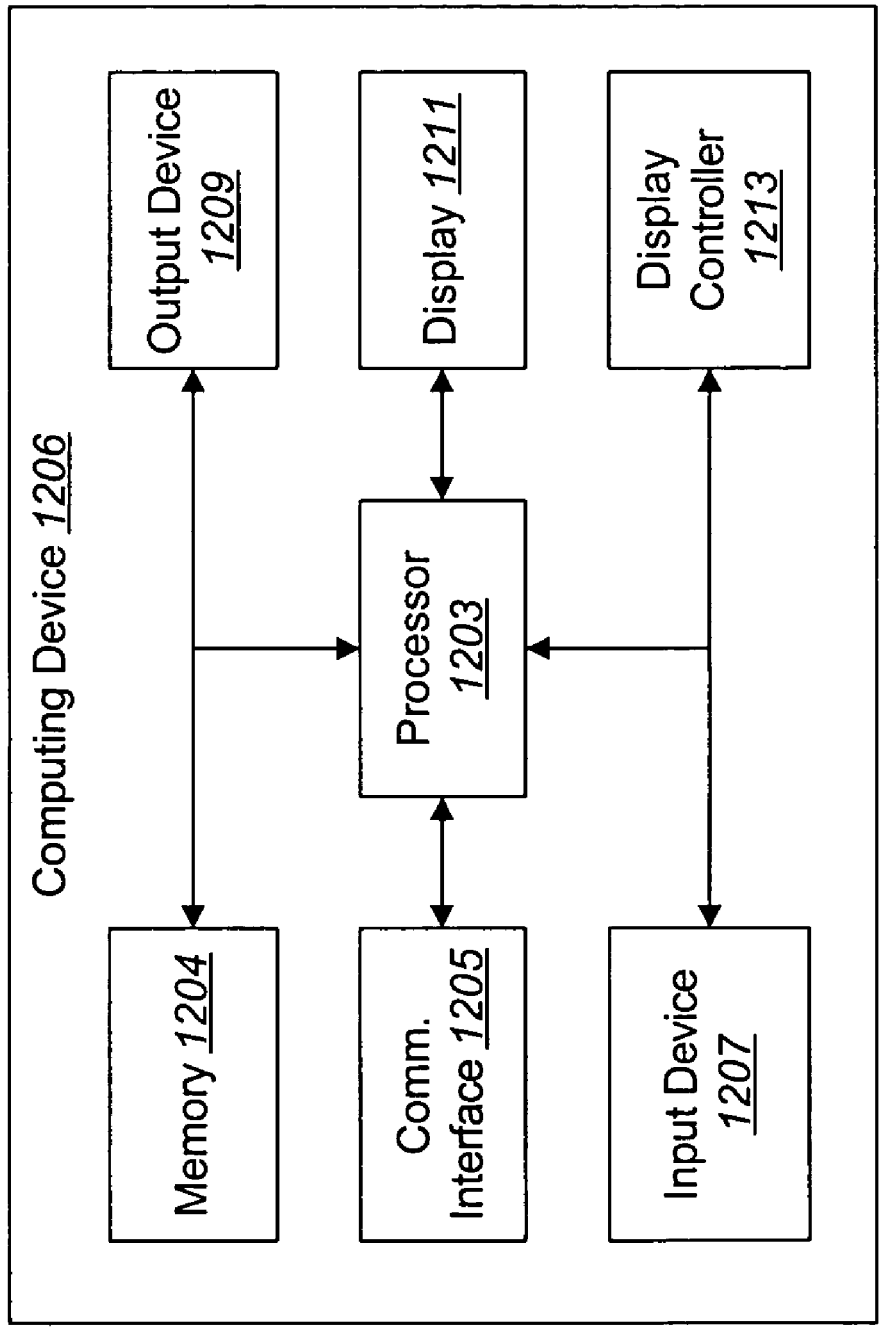
FIG. 12 is a block diagram illustrating the major hardware components typically utilized in a location and telemetry system.

FIG. 12 is a block diagram illustrating the major hardware components typically utilized in a location and telemetry system 1206. The location and telemetry system 1206 is typically implemented in a computing device 1206. The illustrated components may be located within the same physical structure or in separate housings or structures.

The computing device 1206 includes a processor 1203 and memory 1204, which have been discussed above. The computing device 1206 typically also includes one or more communication interfaces 1205 for communicating with other electronic devices (e.g., the base stations 104 and the network operations center 110). The communication interfaces 1205 may be based on wired communication technology, wireless communication technology, or both. Examples of different types of communication interfaces 1205 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1206 typically also includes one or more input devices 1207 and one or more output devices 1209. Examples of different kinds of input devices 1207 and output devices 1209 have been discussed above. One specific type of output device which is typically included in a computer system is a display device 1211. Display devices 1211 used with embodiments disclosed herein may utilize any suitable image projection technology, such as a cathode ray tube (CRT), liquid crystal display (LCD), light-emitting diode (LED), gas plasma, electroluminescence, or the like. A display controller 1213 may also be provided, for converting data stored in the memory 1204 into text, graphics, and/or moving images (as appropriate) shown on the display device 1211.

Of course, FIG. 12 illustrates only one possible configuration of a computing device 1206. Those skilled in the art will recognize that various other architectures and components may be utilized. In addition, various standard components are not illustrated in order to avoid obscuring aspects of the invention.

Figure 13:
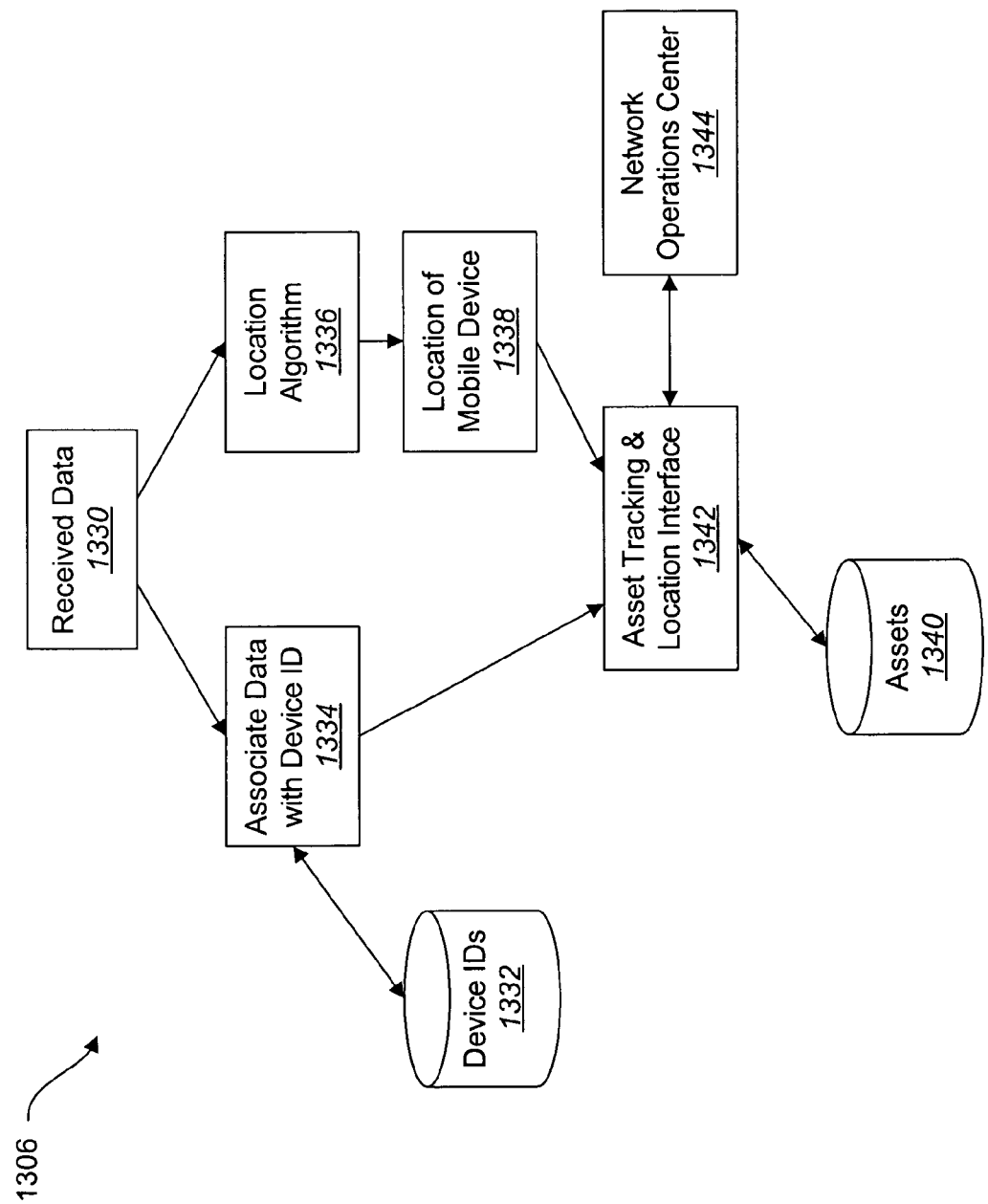
FIG. 13 is a functional block diagram of the location and telemetry system.

FIG. 13 is a functional block diagram of the location and telemetry system 1306. The received data 1330 is associated 1334 with a device ID 320 from a device ID database 1332. The device ID database 1332 may include additional information relating to each device 102.

A location algorithm 1336 is used to determine the location 1338 of the mobile device. Once the location 1338 of the mobile device is determined, it is stored in the asset database 1340. The asset database 1340 thus stores the device ID's and the location of each device at particular times. As a result, a history of each device's location may be found in the asset database 1340. An asset tracking and location interface 1342 is a front end to the asset database 1340. The network operations center 1344 may query the asset database 1340 through the asset tracking and location interface 1342.

The location algorithm/methods are known and are commercially available. One algorithm/method that may be used is the Chan's method. Of course, other types of location algorithms and/or location methods may also be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 14:
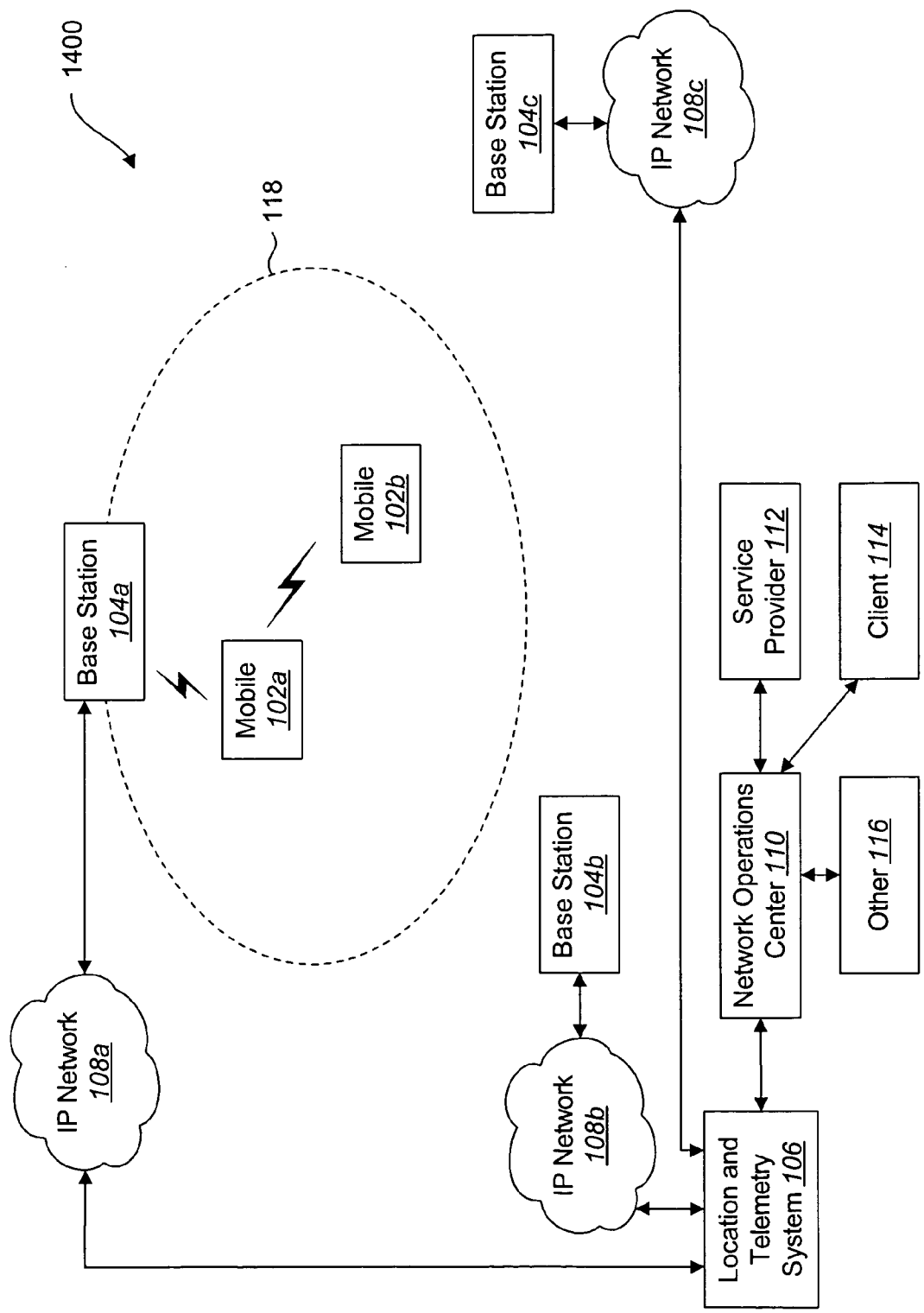
FIG. 14 is a block diagram of a further embodiment of a system for asset tracking through the use of burst DSSS radio signals.

FIG. 14 is a block diagram of a further embodiment of a system 1400 for asset tracking through the use of burst DSSS radio signals. The system 1400 shown in FIG. 14 is very similar to the system 100 outlined above in conjunction with FIG. 1. The difference between FIG. 14 and FIG. 1 is that in FIG. 14, the signals emitted by the device 102a are received only by one of the base stations—i.e., base station 104a—and not the other base stations 104b, 104c. The reason that device 102a does not communicate with the base stations 104b, 104c is that the device 102a falls outside the range of these base stations 104b, 104c. In other embodiments, the device 102a may not be able to communicate with the base stations 104b, 104c because the signal is blocked by a mountain range (or other physical/geographical barrier), interference, etc.

Because the signals emitted by the device 102a are received by the base station 104a, these signals may be used by the location and telemetry system 106 to calculate data telemetry information regarding the device 102a. However, because the signals from the device 102a are only received by the base station 104a, the location determination made by the location and telemetry system 106 will not be as accurate as would otherwise be the case if the base stations 104b and 104c also received the signal. In fact, the location determination that may be made from the signals received only by the base station 104a is that the mobile device 102a is within range of the base station 104a and/or that the device 102a is positioned a specified distance away from the base station 104a. This type of "less-precise" location determination may be sufficient in certain applications where the owner only needs to know that the device 102a is in a specific area rather than the precise location. For example, a shipper may only want to know that the container is within range of a certain port, not the exact location of the container within the port itself. Accordingly, in such applications, only one base station 104a may be needed to communicate with the device 102a and provide the requisite location information.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device for use in a wireless asset tracking system, the mobile device comprising:
    a transmitter configured to communicate with an antenna for transmitting wireless signals;
    a processor;
    memory in electronic communication with the processor, wherein the memory includes:
        a device identification that identifies the mobile device;
        a first PN code;
        a second PN code; and
        instructions stored in the memory, the instructions being executable for:
            spreading transmit data using the first PN code to provide first spread transmit data;
            spreading the first spread transmit data using the second PN code to provide second spread transmit data;
            transmitting the second spread transmit data using a burst direct sequence spread spectrum radio signal; and
            waking out of a low power state through a trigger before spreading.

2. The mobile device of claim 1, wherein the instructions are further executable for returning back to the low power state after the second spread transmit data has been transmitted.

3. A base station that is configured for wireless communication with a plurality of remote mobile devices for use in a wireless asset tracking system, comprising:
    an antenna;
    a receiver in electronic communication with the antenna for receiving wireless signals from the remote mobile devices;
    a processor;
    memory in electronic communication with the processor; and
    instructions stored in the memory, the instructions being executable for:
        receiving a wireless signal from a remote mobile device;
        demodulating the wireless signal to obtain first received data and a first received signal;
        decoding the first received data by first de-spreading with a first PN code and second de-spreading with a second PN code to obtain received data;
        adding a timestamp to the received data according to the first received signal timing;
        transmitting the received data with the timestamp to a system for calculating the location of the mobile device.

4. The base station of claim 3, wherein the base station is not synchronized with the mobile device before, during or after transmitting.

5. The base station of claim 4, wherein the base station is not configured to perform any handshaking with the mobile device before, during or after transmitting.

6. The base station of claim 3, wherein the wireless signal is a burst direct sequence spread spectrum radio signal.

7. The base station of claim 3, wherein the base station is synchronized to a timing reference, and wherein the timing reference is a GPS receiver, a central radio beacon, or a timing reference transmitted over a wire or optical cable.

8. The base station of claim 3, wherein the base station further comprises:
    a first matched filter;
    a bank of frequency shifters that perform complex frequency shifts; and
    a bank of second matched filters.

9. A system for wireless asset tracking comprising:
    a plurality of devices, wherein each device is configured to transmit its device identification, wherein each device performs two spreading operations with two distinct PN codes, a first PN code and a second PN code, and wherein each device transmits data using a burst direct sequence spread spectrum radio signal;
    at least three base stations, wherein each base station is configured to receive the burst direct sequence spread spectrum radio signal, wherein each base station decodes the signal by first de-spreading with the second PN code and second de-spreading with the first PN code, and wherein each base station is further configured to add a timestamp to each received data packet and to forward pertinent despread, demodulated and decoded data with other information including the timestamp to a system for calculating the location of the devices; and
    a system for calculating the location of the devices configured to create location information for each device by calculating the time difference of arrival of received bursts for each base station, and wherein the system for calculating the location of the devices is further configured to store the location and telemetry and to further provide an interface for other systems to access the information and the telemetry data.

10. A system for wireless asset tracking as in claim 9 wherein the plurality of devices are stationary, mobile or relatively stationary.

11. A system for wireless asset tracking as in claim 9 wherein the burst direct sequence spread spectrum radio signal is received by only one of the base stations.

* * * * *

UNITED STATES PATENT AND TRADEMARK OFFICE
CERTIFICATE OF CORRECTION

| | |
|---|---|
| PATENT NO. | : 7,606,288 B2 |
| APPLICATION NO. | : 11/140081 |
| DATED | : October 20, 2009 |
| INVENTOR(S) | : Sy Prestwich et al. |

Page 1 of 1

It is certified that error appears in the above-identified patent and that said Letters Patent is hereby corrected as shown below:

In Column 3, line 45 please replace "reference: The" with --reference. The--.

Signed and Sealed this

Twenty-seventh Day of April, 2010

David J. Kappos
*Director of the United States Patent and Trademark Office*